United States Patent [19]

Soredal

[11] Patent Number: 4,730,009

[45] Date of Patent: Mar. 8, 1988

[54] PLASTIC FOAMS AND METHOD OF MAKING SAME

[76] Inventor: Sven G. Soredal, Birger Jarlsgatan 42, S 114 29, Stockholm, Sweden

[21] Appl. No.: 591,845

[22] Filed: Mar. 21, 1984

[51] Int. Cl.$^4$ .............................. C08J 9/26; C08J 9/28; B29C 45/00; B29C 47/00

[52] U.S. Cl. ...................................... 521/87; 264/49; 264/53; 264/101; 521/79; 521/88; 521/94; 521/95; 521/97; 521/98; 521/143; 521/145; 521/146; 521/149

[58] Field of Search ..................... 264/51, 53, 55, 101, 264/49; 521/87, 88, 79, 94, 95, 97, 98, 143, 145, 146, 149

[56] References Cited

U.S. PATENT DOCUMENTS

| | | | |
|---|---|---|---|
| Re. 18,506 | 6/1932 | Mandel | 264/49 X |
| 1,630,721 | 5/1927 | Snelling | 264/49 X |
| 1,742,515 | 1/1930 | Mandel | 264/49 X |
| 2,216,834 | 10/1940 | Buskirk | 264/55 X |
| 2,283,316 | 5/1942 | Cooper et al. | 264/55 |
| 2,547,997 | 4/1951 | Bowers | 264/49 X |
| 2,751,627 | 6/1956 | Lindemann | 264/55 X |
| 2,795,008 | 6/1957 | Lindemann et al. | 264/DIG. 13 |
| 3,003,192 | 10/1961 | Pfleumer | 264/55 |
| 3,155,379 | 11/1964 | Fischer et al. | 264/51 X |
| 3,328,497 | 6/1967 | Baxter et al. | 264/53 |
| 3,440,309 | 4/1969 | Breukink et al. | 264/53 |
| 3,451,103 | 6/1969 | Aykanian et al. | 264/53 X |
| 3,505,249 | 4/1970 | Skochdopole et al. | 264/53 X |
| 3,647,329 | 3/1972 | Reifenhauser et al. | 264/53 X |
| 3,975,194 | 8/1976 | Farnand et al. | 264/49 X |
| 4,487,231 | 12/1984 | Kobayashi | 264/101 X |

Primary Examiner—Philip Anderson
Attorney, Agent, or Firm—Davis Hoxie Faithfull & Hapgood

[57] ABSTRACT

A plastic foam is made by mixing a plastic material or its origin material with a blowing agent which does not react with the material, said agent having a maximum vapor pressure of 10 Pa at the highest permissible application temperature of the plastic foam and having a minimum vapor pressure of 600 Pa at a pressure at which said material is in plastic condition. A formed body of the mixture is then exposed to a pressure low enough to evaporate the blowing agent and form bubbles in the mixture, whereupon the body is cooled at low pressure to solidify the plastic material and substantially condense said agent, thereby providing said body with closed cells having a reduced internal pressure.

8 Claims, 1 Drawing Figure

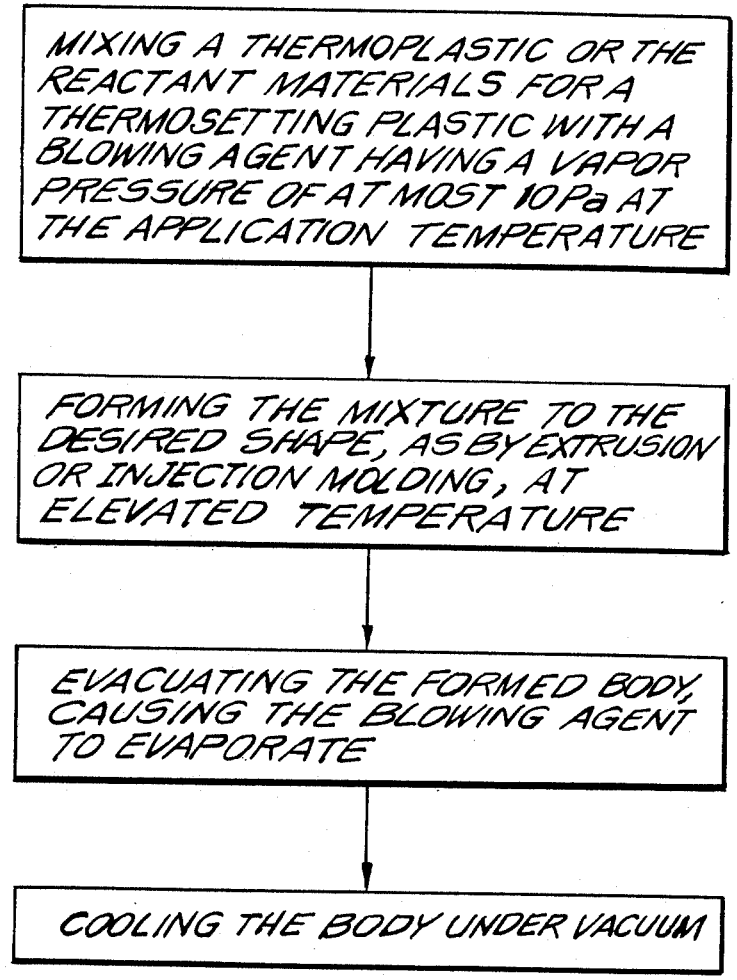

PLASTIC FOAMS AND METHOD OF MAKING SAME

This invention relates to plastic foams with very good heat and sound insulating properties and to methods of making the same. The foams can be used in buildings, refrigerators, and containers for materials which must be kept cold, such as medicines, sensitive chemicals, blood, and liquified gases.

Plastic foams have long been used for heat insulation, preferably plastic foams with closed cells. In these foams, heat and sound are transmitted both through the gas in the cells and through the plastic material.

In prior plastic foams with closed cells, the pressure in the cells is about atmospheric, usually between $6.10^4$ and $15.10^4$ Pa. At a pressure of this magnitude, the heat conductivity of a gas is independent of the pressure. At very low pressure (below about 100 to 1000 Pa (0.75 to 7.5 mm Hg) depending upon the kind of gas and the size of the device, here the size of the cells) the heat conductivity is about proportional to the pressure. In many plastic foams the cells are filled with nitrogen, which has about the same heat conductivity as air. These plastic foams have 10–40% higher heat conductivity than the air. In some foams the cells are filled with carbon dioxide or still heavier gases such as chloro-fluoro-methanes, and these foams have considerably lower heat conductivity than those mentioned above because of lower heat conductivity of the gas.

Still lower heat conductivity can be achieved in plastic foams according to this invention, in which foams the pressure in the cells is very low, not more than 15 Pa at the highest temperature at which the foams are intended to be used. This is attained by mixing a thermoplastic or the reactant materials for a thermosetting plastic with a blowing agent which does not react therewith and which agent has a vapor pressure of at most 10 Pa at the highest temperature of application (use) and not less than 600 Pa (4.5 mm Hg) at a temperature (the working or processing temperature) at which the plastic or its origin material is in plastic condition but does not decompose. For most plastics the highest temperature of application is 50°–180° C. and the working temperature is 140°–350° C. When using the reactant materials the working temperature may be the curing temperature. When the mixing is complete, the mixture is formed to its intended shape and is exposed to such a low pressure at the working temperature that the blowing agent evaporates or sublimes and forms bubbles in the plastic. The formed body is cooled slowly at low pressure to cause the plastic to become rigid, and then the blowing agent will at least partly and usually to a great extent condense or resolidify, thus leaving a very low pressure in the cells. Due to the surface tension of the plastic, the vapor pressure of the blowing agent must be at least 600 Pa at the working or processing temperature because the pressure in a bubble in a fluid is higher than that in the fluid, the difference being greater the smaller the bubble is and the higher the surface tension is.

The preferred method of the invention is summarized in the accompanying drawing showing four steps.

EXAMPLE 1

A foam of an acetal resin with anthracene as the blowing agent. It can be made by kneading acetal resin together with 1–2% by weight powder of anthracene with 0.02–0.05 mm particle size at 205°–215° C. until the mixture is uniform and the plastic totally surrounds the particles. The mixture is pressed through a slit, 2 mm wide, to a channel as broad as the slit and the width of which gradually increases from that of the slit to 22 mm, then gradually decreases to 20 mm and is then constant. In the channel there are small slits or holes connected to a vacuum pump giving less than 200 Pa absolute pressure. To the point where the width is constantly 20 mm the temperature is held constant, and it is then gradually brought down to room temperature at the end of the channel.

This plastic foam can be used at up to 50° C. if the density is 70 kg/m$^3$ and a little higher at higher density. The vapor pressure of anthracene is 0.13 Pa at 50° C.

Acetal resins have a very small diffusion coefficient for air and most common gases and vapors. Hence, this plastic foam will maintain its low heat and sound conductivity for a long time.

EXAMPLE 2

Paraffin oil with the distillation range 230°–300° C. is emulsified by means of ultrasound in a mixture of polyvinylidene chloride with 15% dioctyl phthalate and an emulsifier at 190° C. The mixture is injection molded at 190° C. in a first form to the desired shape but with greatly reduced thickness. The body is removed from the first form and is brought into another form with the desired thickness provided with slits or holes connected to a vacuum pump by which the absolute pressure is reduced to less than 5000 Pa (38 mm Hg) at 190° C. The body is allowed to second form to below 50° C. at the low pressure.

Even this plastic foam can be used at up to 50° C. at 70 kg/m$^3$. Then the vapor pressure is 9 Pa.

Polyvinylidene chloride has only slightly greater diffusion coefficient than acetal resins and is cheaper. Consequently, it is in many cases advantageous.

EXAMPLE 3

Polystyrene is mixed with 20% by weight of triphenyl phosphate and 2% anthracene or an ester with an adequate vapor pressure, e.g., trimethyl citrate, at 240° C. These additives are soluble in the melted plastic thus facilitating the mixing operation. An insoluble powder, e.g., chalk or fine silica, may be added as vapor bubble nuclei. The mixture is injection molded or extruded at 240° C. to the desired shape but with greatly reduced thickness and treated as in EXAMPLE 1 or 2.

Even with polystyrene it is possible to use a blowing agent insoluble in the plastic, e.g., ammonium salts such as the chloride, the acetate, or the benzoate.

This plastic foam will lose a part of its insulation properties faster than the foams according to EXAMPLES 1 and 2 because the diffusion coefficient for air is greater. However, it is in the outermost layer of cells, where the pressure will exceed e.g. 300 Pa, that the insulation deteriorates rather soon. The pressure in the second layer will reach this level after about 30–100 times longer period and so on. Therefore, if the cell size is small compared with the thickness, the material will maintain most of its insulation capability for a long time. Those parts where the pressure exceeds 300 Pa will have the same insulation as the plastic foams used today.

Usually the density of a foam is higher at its surface. This density distribution can to a great extent be controlled during the manufacturing process by compressing the surface after the expansion, as mentioned in EXAMPLE 1. The higher density near the surface, due to thicker walls compared with the cell size, is very useful in the foams according to this invention because in the walls of the outermost cells there will be a stress depending upon the pressure difference, so the mean density of the foam can be lower than at a uniform density distribution. In addition, the gas diffusion is delayed because of the thicker walls near the surface. A proper choice of the density distribution can make the use of other plastics than acetal resins and polyvinylidene chloride possible even for applications requiring good insulation for a long time, especially if the cell size is small compared with the thickness.

The maximum application temperature of this plastic foam is about 50° C. Then the vapor pressure, is for anthracene 0.13 Pa, for trimethyl citrate 5.8 Pa and for ammonium chloride 0.06 Pa.

EXAMPLE 4

A diisocyanate and a polyol, e.g. hexamethylene diisocyanate and glycerol combined with propene oxide containing a little hydroquinone monomethyl ether as stabilizer, are mixed with powder of a halogenated hydrocarbon with a vapor pressure of 5000 Pa at 180°-250° C. (e.g. hexachlorobenzene), formed to the intended shape, heated and cured while under vacuum and allowed to cool under vacuum.

The maximum application temperature is 60° C. and the vapor pressure 5.3 Pa.

EXAMPLE 5

A polyolefin, such as polyethylene or polypropylene, is heated to 200°-240° C. depending on the type, the molecular weight and the crystallinity. Through a number of very thin capillaries glycerol is supplied under high pressure, thus forming small droplets with very uniform size. The capillaries are moved in a way giving homogeneous distribution of the droplets throughout the plastic. After the mixing is finished, the workpiece is evacuated and treated in any of the ways described above.

This foam can be used at up to 80° C. where the vapor pressure is 5.7 Pa.

EXAMPLE 6

Polyphenylene sulfide is kneaded with fine powder of 1,5-dinitro anthraquinone at 310°-320° C., formed, evacuated to less than $10^4$ Pa, and cooled at low pressure in any of the ways described above. This foam can be used at up to 150° C. and then the vapor pressure is 6.8 Pa.

Other plastics which can be used are epoxy resins, polyesters such as polyethylene terephthalate, polyacrylates, cellulose esters, ethyl cellulose, and many copolymers. For each plastic the blowing agent must be chosen carefully considering possible reactions with any of the constituents and the vapor pressure within the possible working temperature range and at the maximum application temperature.

The blowing agent may be an aliphatic or aromatic hydrocarbon, a halogenated hydrocarbon, an alcohol, an ester, or a ketone (quinone derivative) as exemplified above. It can also be a carboxylic acid, e.g. glutaric acid, an amine or derivates of these compounds. As well as ammonium salts, alkyl ammonium salts may be used, e.g. methyl ammonium chloride (methylamine hydrochloride).

It will be understood from the foregoing that "vapor pressure" is used in the conventional sense to refer to absolute pressure of the vapor. The blowing agents of the invention are liquids or solids and have an absolute vapor pressure of at most 10 Pa at the temperature of application (or use) and of at least 600 Pa at the working or processing temperature.

The production steps from the different examples may be combined at will in order to get the simplest and most economical production in every particular case. One or several of the production steps may be carried out continuously or in batches.

The term "Pa" used herein identifies the Pascal, a pressure unit defined as one Newton/$m^2$.

One Torr or 1 mm mercury is equal to 133 Pa, so that one atmosphere (760 mm Hg) is about $10^5$ Pa.

I claim:

1. A plastic foam having a maximum permissible application temperature of about 50°-180° C., said foam having closed cells, and the vapor of a physical blowing agent contained in said cells, said vapor having an absolute pressure of less than 10 Pa at said application temperature, said blowing agent being one which does not react with the plastic material of the foam.

2. The foam of claim 1, in which the plastic is a thermoplastic.

3. The foam of claim 1, in which the plastic is a thermosetting plastic.

4. The foam of claim 1, in which the blowing agent is selected from the group consisting of hydrocarbons (including halogenated hydrocarbons), alcohols, carboxylic acids, esters, nitro compounds and ketones.

5. The foam of claim 1, in which the blowing agent is an ammonium salt.

6. The foam of claim 5, in which said salt is an alkyl ammonium salt.

7. In the manufacture of a plastic foam having a maximum permissible application temperature of about 50°-180° C., the method which comprises forming a mixture of a thermoplastic material and a physical blowing agent which does not react with said material, said blowing agent having an absolute vapor pressure of at most 10 Pa at said temperature and at least 600 Pa at a temperature at which said material is in plastic condition, forming said mixture into a body of desired shape, as by extrusion molding or injection and transfer molding, evacuating the formed body to evaporate or sublime the blowing agent and thereby form bubbles in the plastic material while in plastic condition, and cooling said body at low pressure to cause the plastic material to become rigid and to at least partly condense or resolidify the blowing agent, thereby providing said body with closed cells having a very low internal pressure.

8. In the manufacture of a plastic foam having a maximum permissible application temperature of about 50°-180° C., the method which comprises forming a mixture of the reactant materials for a thermosetting plastic and a physical blowing agent which does not react with said materials, said blowing agent having an absolute vapor pressure of at most 10 Pa at said application temperature and at least 600 Pa at the curing temperature of the plastic, forming said mixture into a body of desired shape, as by injection molding, heating and evacuating the formed body to evaporate or sublime the blowing agent and thereby form bubbles in said mixture at said curing temperature, and cooling said body at low pressure to cause the plastic to become rigid and to at least partly condense or resolidify the blowing agent, thereby providing said body with closed cells having a very low internal pressure.

* * * * *

UNITED STATES PATENT AND TRADEMARK OFFICE
CERTIFICATE OF CORRECTION

PATENT NO. : 4,730,009
DATED : March 8, 1988
INVENTOR(S) : Sven G. Soredal

It is certified that error appears in the above-identified patent and that said Letters Patent are hereby corrected as shown below:

Column 2, line 32, before "second" insert --cool in the--.

Signed and Sealed this

Eleventh Day of October, 1988

Attest:

DONALD J. QUIGG

*Attesting Officer*  *Commissioner of Patents and Trademarks*